US007251628B1

(12) United States Patent
Edlund et al.

(10) Patent No.: US 7,251,628 B1
(45) Date of Patent: Jul. 31, 2007

(54) AUTOMATED PURCHASING AGENT SYSTEM AND METHOD

(75) Inventors: Stefan B. Edlund, San Jose, CA (US); Daniel A. Ford, Los Gatos, CA (US); Reiner Kraft, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/417,065

(22) Filed: Oct. 13, 1999

(51) Int. Cl.
*G06Q 40/00* (2006.01)

(52) U.S. Cl. .......................... 705/37; 705/26; 705/27; 705/37; 705/38; 705/80

(58) Field of Classification Search ................ 705/26, 705/27, 78, 80, 28, 37, 38
See application file for complete search history.

(56) References Cited

U.S. PATENT DOCUMENTS

| | | | | |
|---|---|---|---|---|
| 4,992,940 A * | 2/1991 | Dworkin | ...................... | 705/26 |
| 5,664,111 A | 9/1997 | Nahan et al. | .................. | 705/37 |
| 5,694,323 A | 12/1997 | Koropitzer et al. | ........... | 705/37 |
| 5,774,873 A | 6/1998 | Berent et al. | .................. | 705/37 |
| 5,794,207 A * | 8/1998 | Walker et al. | ................ | 705/26 |
| 5,826,244 A * | 10/1998 | Huberman | .................... | 705/37 |
| 5,835,896 A | 11/1998 | Fisher et al. | .................. | 705/37 |
| 5,862,223 A | 1/1999 | Walker et al. | ................ | 705/26 |
| 5,870,723 A | 2/1999 | Pare, Jr. et al. | ............... | 705/37 |
| 5,890,138 A * | 3/1999 | Godin et al. | ................... | 705/26 |
| 5,966,697 A * | 10/1999 | Fergerson et al. | ............ | 705/26 |
| 6,035,289 A | 3/2000 | Chou et al. | ................... | 705/37 |
| 6,085,176 A * | 7/2000 | Woolston | ..................... | 705/37 |
| 6,141,653 A * | 10/2000 | Conklin et al. | ................ | 705/80 |
| 6,151,589 A | 11/2000 | Aggarwal et al. | ............ | 705/37 |
| 6,415,270 B1 * | 7/2002 | Rackson et al. | .............. | 705/37 |
| 6,598,026 B1 * | 7/2003 | Ojha et al. | .................... | 705/26 |
| 6,871,190 B1 * | 3/2005 | Seymour et al. | .............. | 705/37 |

OTHER PUBLICATIONS

Abstract to Japanese Patent No. JP10063741 A, Mar. 6, 1998.
Abstract to "The Michigan Internet AuctionBot: A Configurable Auction Server for Human and Software Agents", Wurman, PR, et al, Proceedings of the Second International Conference on Autonomous Agents, pp. 301-308, New York, New York, USA, 1998, xi+478 pp.

(Continued)

*Primary Examiner*—Nga Nguyen
(74) *Attorney, Agent, or Firm*—Leonard T. Guzman; Jon A. Gibbons; Fleit Kain Gibbons Gutman Bongini & Bianco P.L.

(57) ABSTRACT

A system and method of automating and managing bids within the context of an Internet auction is disclosed. The present invention permits continuous monitoring and verification of auctions on the Internet based on criterion such as highest bid on an item, maximum permissible bid, and a restriction on the number of successful bids in the auctions by any given participant (0109). The present invention permits embodiments incorporating an auction profile database (0101) that is generated by an auction profile configuration tool (0102) to act as input to an item search manager (0104) that takes data from an item database (0105) and control from an item selector (0103) to then interact with an auction bid controller (0106) that communicates with the remote auction site via an auction command interface (0107).

In accordance with another embodiment of the present invention, an information processing system and computer readable storage medium is disclosed for carrying out the above method.

19 Claims, 3 Drawing Sheets

OTHER PUBLICATIONS

Abstract to "Evolving a Multi-Agent Information Filtering Solution in Amalthaea", Moukas, A., et al, Proceedings of the First International Conference on Autonomous Agents, pp. 394-403, New York, New York, USA, 1997, xvi+549 pp.

Abstract to "Intelligent Agents for Matching Information Providers and Consumers on the World-Wide-Web", Lee, JKW, et al, Proceedings of the Thirtieth Hawaii International Conference on System Sciences (Cat. No. 97TB100234), Pt. vol. 4, pp. 189-199, vol. 4, Los Almitos, California, USA, 1997, 6 vol.

Abstract to "A Decision Support System for Bidding Process", Sebal, S, et al 1997 IEEE International Conference on Systems, Man, and Cybernetics, Computational Cybernetics and Simulation (Cat. No. 97CH36088-5), Pt. vol. 4, pp. 3603-3608 vol. 4., New York, New York, USA, 1997, 5 vol. 4535 pp.

* cited by examiner

AUTOMATED PURCHASING AGENT SYSTEM AND METHOD

CROSS-REFERENCE TO RELATED APPLICATIONS

Not applicable

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The invention disclosed broadly relates to the field of Internet Search Engines and E-commerce technology, and has special application to the emerging on-line markets of web-based auction sites.

2. Description of the Related Art

The electronic auction sales paradigm exemplified by web-based auction sites such as such as eBay, Onsale, Yahoo and the like allows purchasers to bid for items they want to buy. The great advantage of this business model is that the potential buyer has the possibility to define the price that he/she is willing to pay for this item. In contrast to traditional sales/purchase paradigms, a 'price' in this electronic marketplace is not a fixed quantity, but rather a dynamic entity. Because of this fact, the popularity of web-based auction sites is growing rapidly. Additionally, more and more purchasers are becoming involved and taking advantage of this auction based buying on the World Wide Web (WWW). In the near future it is highly probable that dynamic prices for buying items will become a standard, especially as world commercial markets become more tightly integrated.

The problem present with the prior art is the inherent difficulty for the purchaser in managing this kind of price-based buying. There are several problems for a potential buyer. First, Web-based auctions produce fierce competition. Because of the possibilities of the Internet the competition in price bidding is neither geographically nor temporally limited. Purchasers are able to bid 24 hours a day from essentially any place in the world. Because of this competition, it is not guaranteed that a purchaser eventually succeeded in purchasing the item that he/she desires. To ensure that the purchaser even has a good chance at success with this bidding system, he/she must be diligent regarding both monitoring of auction sites and placement of bids for desired items.

A second problem for a potential buyer is managing bids across one or more sites. There are growing number web-based auction sites, making management of bids across these different sites difficult. One and the same item can be sold on different sites simultaneously and independently (e.g. a seller wants to increase the probability of selling the item, so he/she submits the same item on different web-based auctions). This structure is difficult to manage and coordinate manually using conventional web-based user interface tools.

A third problem is the purchase of a commodity product. Most times a buyer need not have a particular item, but rather is purchasing a commodity product. The desired item could be a mass product (e.g. CDROM, music cassette, etc.) and as such there may be a wide variety of sources for the product. So one auction site can offer mass products items in several auctions simultaneously from different sellers. Additionally, there can be more then one auction web site that offers this type of item. For instance, a 'greatest hits' compact disc of a popular rock band is a commodity product, wherein thousands of copies will typically be available for sale. In this case there could be several ongoing auctions on the same or different web sites from different sellers. The problem for the purchaser in these circumstances is to choose the best auction for the desired item.

Current software tools available to purchasers within web-based auction contexts do not address these deficiencies and as such the bidding process in these situations generally is dictated as much by luck as by the skill and experience of the purchaser.

SUMMARY OF THE INVENTION

Current systems and web-based auction sites provide mechanisms to search for individual items as well as place and cancel bids. However, they do not provide the functionality required to overcome the above-mentioned procedural problems associated with a disparate and non-uniform web-base auction system. Purchasers have to do the entire bidding process manually. They must carefully monitor their active auctions and must quickly react when other persons place higher bids on a desired item. Therefore, the buying process is somewhat time consuming and the purchaser is probably not able to get the best possible deal, because it takes too much time for humans to manually monitor and subsequently discover all the best auctions available.

The present invention solves the deficiencies associated with the prior art by allowing purchasers to manage their auction sites automatically. This automated control includes adding, updating, and removing auction sites. For every auction site the purchaser provides an auction configuration profile that is conveniently generated by an auction profile configuration software tool incorporated as a subsystem within the present invention. This software will produce the configuration profile information for each selected auction site. The configuration profile information basically contains a protocol to access the auction site, how to retrieve a list of current auctions, how to search an auction site, how to place or cancel a bid, purchaser and password information for the auction site, along with additional information about the site (e.g., format specification for extraction of data). Additionally, since purchaser identification and password information is usually required on auction sites in order to access them, the present invention may automatically manage this aspect of the auction bidding process.

Since the present invention has knowledge of what auction sites are available and how to communicate with them using the configuration profile information provided, this permits a purchaser to select or define an item that they are interested in purchasing and have the bidding associated with that item done automatically. The purchaser will set a price range of what they are willing to pay for the desired item. The present invention will then automatically contact the defined auctions sites and perform a query (poll) in specific time intervals to determine whether the selected item is currently available for purchase. With this information one preferred embodiment will then automatically select the auction with the lowest current bid and place a bid there.

Within the context of this system and process, the present invention provides safeguards to ensure that at the end of all auctions one or more of the following goals have been met:

The purchaser will have placed the highest bid on the item, so that he/she actually is able to buy it.
1. The defined bid maximum will not be exceeded.
2. The purchaser will be the winner of only one auction for the specific item. That means that a prospective purchaser eventually obtains title to the desired quantity of the item as requested.

The present invention specifically anticipates continuously monitoring the selected auctions and uses algorithms described below to ensure that these goals are fulfilled.

Briefly, in accordance with the present invention,

In accordance with another embodiment of the present invention, an information processing system and computer readable storage medium is disclosed for carrying out the above method.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF AN EMBODIMENT

Figure 1:
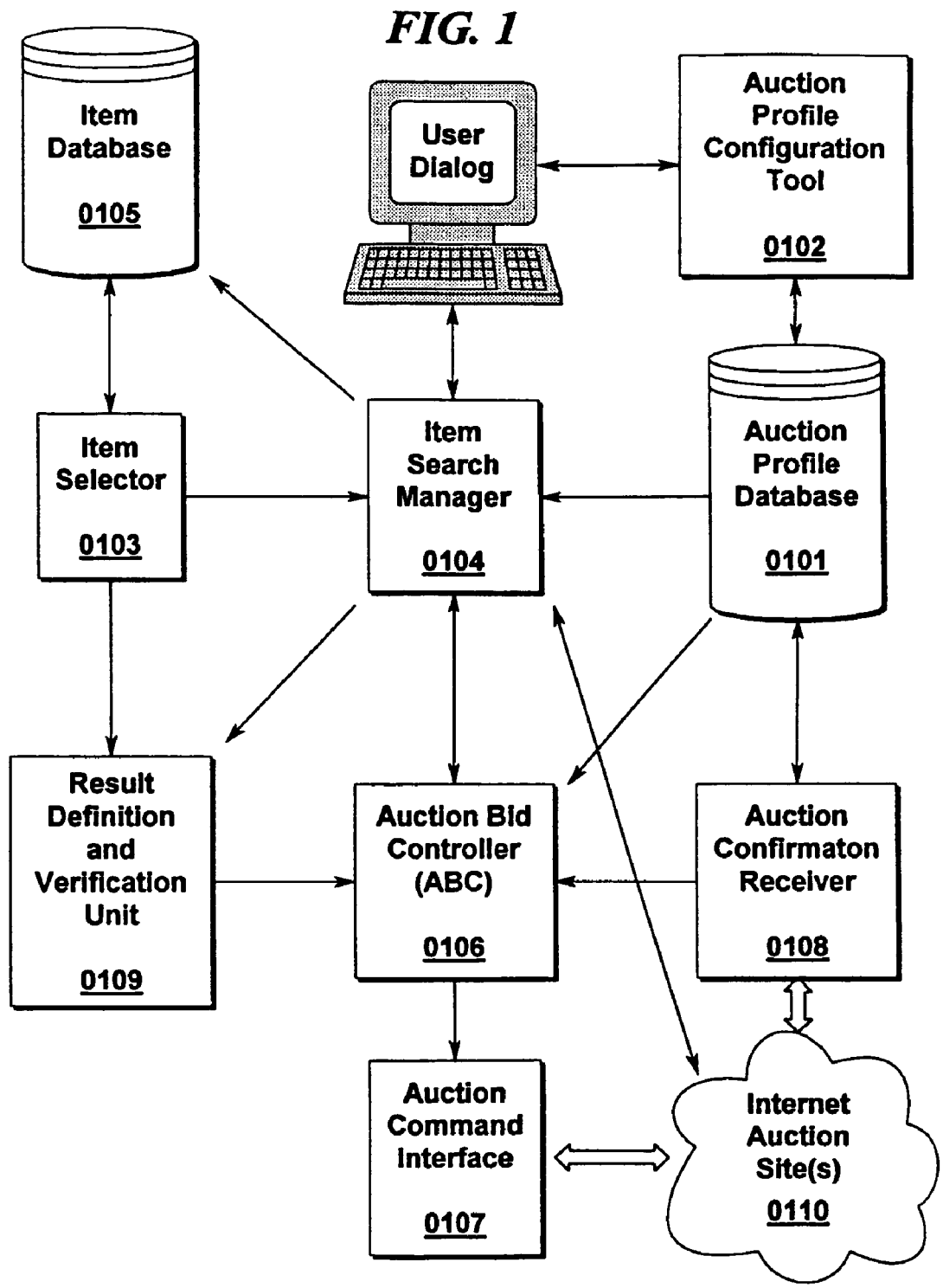
FIG. 1 illustrates an architectural system block diagram of an exemplary embodiment of the present invention.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiments, wherein these innovative teachings are advantageously applied to the particular problems of an AUTOMATED PURCHASING AGENT SYSTEM AND METHOD. However, it should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

Definitions

Throughout the discussion in this document the following definitions will be utilized:

Auction/Bid Not Limitive

Throughout the discussion of the present invention the term 'auction' and/or 'bid' may be used in the context of an Internet based auction and bidding example. These terms are to be given their broadest possible meanings within the context of this disclosure. While several disclosed embodiments of the present invention are specifically targeted towards Internet auctions and the like, other embodiments of the present invention may be utilized to attack similar problems in wildly different sales/purchase environments. Thus, the entire broad context of sales and purchase order bidding that occurs within normal commerce is within the anticipated scope of the present invention.

System Blocks/Procedural Steps Not Limitive

The present invention may be aptly described in terms of exemplary system block diagrams and procedural flowcharts. While these items are sufficient to instruct one of ordinary skill in the art the teachings of the present invention, they should not be strictly construed as limiting the scope of the present invention. One skilled in the art will be aware that system block diagrams may be combined and rearranged with no loss of generality, and procedural steps may be added or subtracted, and rearranged in order to achieve the same effect with no loss of teaching generality. Thus, it should be understood that the present invention as depicted in the attached exemplary system block diagrams and procedural flowcharts is for teaching purposes only and may be reworked by one skilled in the art depending on the intended target application.

Personal Computer Not Limitive

Throughout the discussion herein there will be examples provided that utilize personal computer (PC) technologies to illustrate the teachings of the present invention. The term 'personal computer' should be given a broad meaning in this regard, as in general any computing device may be utilized to implement the teachings of the present invention, and the scope of the invention is not limited just to personal computer applications.

Additionally, while the present invention may be implemented to advantage using a variety of Microsoft™ operating systems (including a variety of Windows™ variants), nothing should be construed to limit the scope of the invention to these particular software components.

EXAMPLE

The following provides an exemplary example of this system in action, and explain how the invention could be used in order to buy a commodity 'greatest hits' rock music CD.

A prospective purchaser first registers and obtains access to at least one auction web site. By registering he/she will be provided with an auction user identification and a password. The purchaser generally enters this information into an information screen dialog with the present invention and creates a configuration profile for this auction web site. After this the present invention is able to communicate with this registered auction site. At this time the purchaser could register at more auction web sites and insert this data to create more auction site profiles.

Then the purchaser will enter his/her purchasing request along with the maximum amount of money he/she is willing to pay for the requested item. In this example, the 'greatest hits' CD would constitute the purchasing request. The present invention now queries the auction site to determine if the desired CD is currently available for bidding. In case that the CD is available and the current bidding price is below the defined maximum, it will automatically place a bid. Then it will monitor the bid and place additional bids if necessary. For instance it could happen that someone placed a higher bid, and the auction terminated. The present invention then searches for another ongoing auction that would be appropriate to meet the user purchase requirements. Additionally, it could place more bids on different auctions if it seems to be necessary to enhance the probability of buying the desired item. In case, that the time is running out on an auction, where it holds the highest bid, and there are also high bids in other auctions placed, it will cancel these bids to ensure, that only one 'greatest hits' CD is purchased at the termination of auction bidding.

Overall the present invention will likely become a significant e-commerce tool that helps purchasers to manage the more and more complicated dynamic buying process associated with web-based auctions. Given the rapid growth in e-commerce and the warm welcome that this purchasing paradigm has received in the retail marketplace, the present invention provides a convenient and efficient mechanism to exploit this new purchasing methodology.

System

As illustrated in FIG. 1, exemplary embodiments of the present invention consist of the following components:

Auction Profile Database (0101);

1. Auction Profile Configuration Tool (0102);
2. Item Selector (0103);
3. Item Search Manager (0104);
4. Item Database (0105);
5. Auction Bid Controller (0106);
6. Auction Command Interface (0107);
7. Auction Confirmation Receiver (0108);
8. Result Definition and Verification Unit (0109);

The following sections contain a detailed description of these components, making specific reference to the exemplary system block diagram of FIG. 1.

Auction Profile Database (0101)

The Auction Profile Database (0101) stores auction profiles of web-based auction sites. An auction profile typically contains the following information: How to access an auction site (protocol, URL, etc.).

1. Purchaser identification and password of the purchaser (authentication method).
2. Command language to place and cancel bids.
3. How to perform search for items.
4. General description of how to extract item information.
5. Format of search results for items to extract these
6. Format of notification for bid status, and other notification events.

Overall these profiles describe how to interact with a web-based auction site and how to automatically retrieve desired data of items. Although the functionality of these sites is typically the same, the method of accessing data may differ dramatically. The auction profiles provide a way to access these sites in a standard way. The format to store and describe auction profiles could be based on the Extended Markup Language (XML). To describe the format of a web document in order to extract specific data it is possible to use TAPS technology. TAPS is also based on XML and allows the format of a web document to be described. With the help of this description (e.g., a DTD—Document Type Definition) the present invention is able to locate for example a description of an item in a web document. However, TAPS is just one way of retrieving this information. It is also possible to use existing parser and web filter technology to retrieve the required information from these web sites. One skilled in the art will no doubt realize that there are a plethora of equivalent methods to achieve these same results.

Auction Profile Configuration Tool (0102)

The Auction Profile Configuration Tool (0102) helps purchasers to generate and store the auction profiles in the Auction Profile Database (0101). Because the syntax of an auction profile can become complex, the task of this tool is to remove the complexity from the purchaser. It might use a graphical user interface along with a user-friendly wizard to guide the purchaser through the process of creating an auction profile. Additionally, auction profiles for popular auction sites could be already integrated in Auction Profile Database (0101). So there would be no need to generate auction profiles for these sites. However, authentication information is purchaser-dependent and needs to be added to the auction profile. Also, the tool is able to update and delete auction profiles.

Item Selector (0103)

The Item Selector (0103) provides a mechanism for the purchaser to enter a desired item for purchase. It uses the Item Database (0105) to store information of items (properties) for further reuse. The purchaser enters the item information typically in an electronic form (for example, by using a textbox dialog screen). An item generally consists of a name, an optional description, or a unique identification number (for example, ISBN number for books). The Item Selector (0103) could also present a list of the stored items in the Item Database (0105) to the purchaser for selection. If the purchaser is finished with an item selection, a query for the item will be performed first against the Item Database. The goal is to retrieve additional information for an item if available. This could help to improve the search accuracy of the Item Search Manager (0104) component. The complete item information along with an optional description is then passed to the Item Search Manager (0104) for further processing.

Item Search Manager (0104)

After the Item Search Manager (0104) receives the item information from the Item Selector (0103) component, it will perform a query for this item on all available auction web sites stored in the Auction Profile Database (0101). Thereafter the Item Search Manager (0104) will use the auction profile information stored in the Auction Profile Database (0101) to build the correct query strings. The goal is to find out which web-based auction sites have the item currently available for bidding. The auction sites will produce search results and return these results to the Item Search Manager (0104) that in turn will consolidate this information to one or more lists.

The Item Search Manager (0104) then will parse these result pages and extract the required information. It will also collect additional information of the item (e.g., a more detailed description) if available and store this item information in the Item Database (0105) for further reuse to enhance search accuracy. To extract the item information from the result pages of the auction sites, it uses the information stored in the Auction Profile Database (0101). As a result it will generate one or more lists containing the following information:

Item Name
1. Item identification (if available).
2. Item Description (if available).
3. Multimedia Description (e.g., picture, video, etc., if available).
4. One or more lists of all current auctions where the item is currently available for bidding, along with current bid price, auction duration, etc.

This list will be passed to the Result Definition and Verification Unit (0109) for further processing.

Another functionality of the Item Search Manager (0104) is that it will perform periodic querying of the available auction sites for items in which the purchaser has interest. This feature will generate an updated list and forward this list to the Auction Bid Controller (0106) for auction status control processing. Also it will perform auction querying on demand by the user via use of the Auction Bid Controller (0106).

Result Definition and Verification Unit (0109)

The Result Definition and Verification Unit (0109) component receives the item information/description from the Item Selector (0103) in which the purchaser has interest, along with a list of auctions generated from the Item Search Manager (0104). Basically, the Result Definition and Verification Unit (0109) presents the current bid range of all the auctions to the purchaser and prompts for a maximum permissible bid the purchaser is willing to spend for the desired item.

It could be possible that there are no auctions available for the desired item. In this case the purchaser has to specify another item and the process will start from the beginning. After the purchaser defines a bid maximum, the complete information (includes item, list of auctions for the item, maximum bid) will be passed to the Auction Bid Controller (0106) that is the key management component for all bidding on behalf of the purchaser.

Auction Bid Controller (0106)

As explained above, the Auction Bid Controller (ABC) (0106) component is responsible for the whole bid management process. The ABC (0106) receives its task from the Result Definition and Verification Unit (0109). With this information, the ABC (0106) starts to look for an auction that offers the desired item for the lowest price. The ABC (0106) then forwards a bid request to the Auction Command Interface (0107). The ABC (0106) keeps track of the status of all auctions. If a bid request was successful, it will receive a notification from the Auction Confirmation Receiver (0108). The corresponding auction in the list will be then marked as "active". There may be zero or more auctions marked as active at any given time.

From time to time the ABC (0106) may request a status update from the Item Search Manager (0104). The reason for this is to find out whether there are additional auctions available for the particular item that were not listed previously. It could be the case that a new auction was detected for the item that posts a lower price than the current active auction. In this case, the Auction Bid Controller (0106) will try to place a smaller bid there. If successful, it will cancel other active auctions with a higher bid price. The overall goal is to have at least one active auction that should produce the lowest price for the item.

In case the Auction Bid Controller (0106) receives an outbid notice from the Auction Confirmation Receiver (0108) for an active auction, it has to determine whether it makes sense to place a higher bit on this auction, or whether there is an auction where even a lower bid could be placed, in order to have the highest accepted bid in a given auction. In case there are no other auctions and the maximum price range for the item has not exceeded, it will request a higher bid for the auction from where it received the outbid notification.

Finally, if the Auction Bid Controller (0106) receives an "end of auction" notice, where it placed the highest bid (and therefore won the auction), the item is marked as "success". All other active auctions will be canceled (a cancel request will be send to the Auction Command Interface). The information of the successful auction purchase will then be passed to the purchaser in order that the purchaser may be able to contact the seller regarding payment and delivery Note that the Auction Bid Controller (0106) will only finish execution if an item could be successful bought;
1. there are no auctions available for an item;
2. all auctions available require a bid amount higher then the desired maximum; or
3. a purchaser wished to cancel all auctions for the item.

Otherwise it will continue to request new searches and generate bid requests and/or cancellations until the purchase goal has been satisfied.

Auction Command Interface (0107)

There are two components that are responsible for the communication with the Internet Auction Sites (0110). The first Internet communications system component is termed the Auction Command Interface (0107) and is designed to receive bid and cancellation requests from the Auction Bid Controller (0106). The Auction Command Interface (0107) typically uses the information stored in the Auction Profile Database (0101) provided by the Auction Bid Controller (0106) to transform the auction requests into commands that the corresponding auction site understands. Once this translation has been performed, the Auction Command Interface (0107) will send the request to the Internet Auction Site(s) (0110) (e.g., using Internet TCP/IP communication or some other suitable protocol). In summary, the Auction Command Interface (0107) is generally responsible for all outgoing auction requests.

Auction Confirmation Receiver (0108)

The second Internet communications system component is termed the Auction Confirmation Receiver (0108) and is designed to handle all incoming requests, such as bid conformations, outbid notifications, etc. These notifications will be delivered from the Internet Auction Site(s) (for example) using email communication. All the requests will be transformed/translated in a way that the Auction Bid Controller (0106) can understand the resulting message context. The information the Auction Confirmation Receiver (0108) needs is stored in the Auction Profile Database (0101). With this information the incoming notification can be parsed and the important auction status information can be extracted and later utilized by other system components consistent with the purchasing goals described above.

Method

Figure 2:
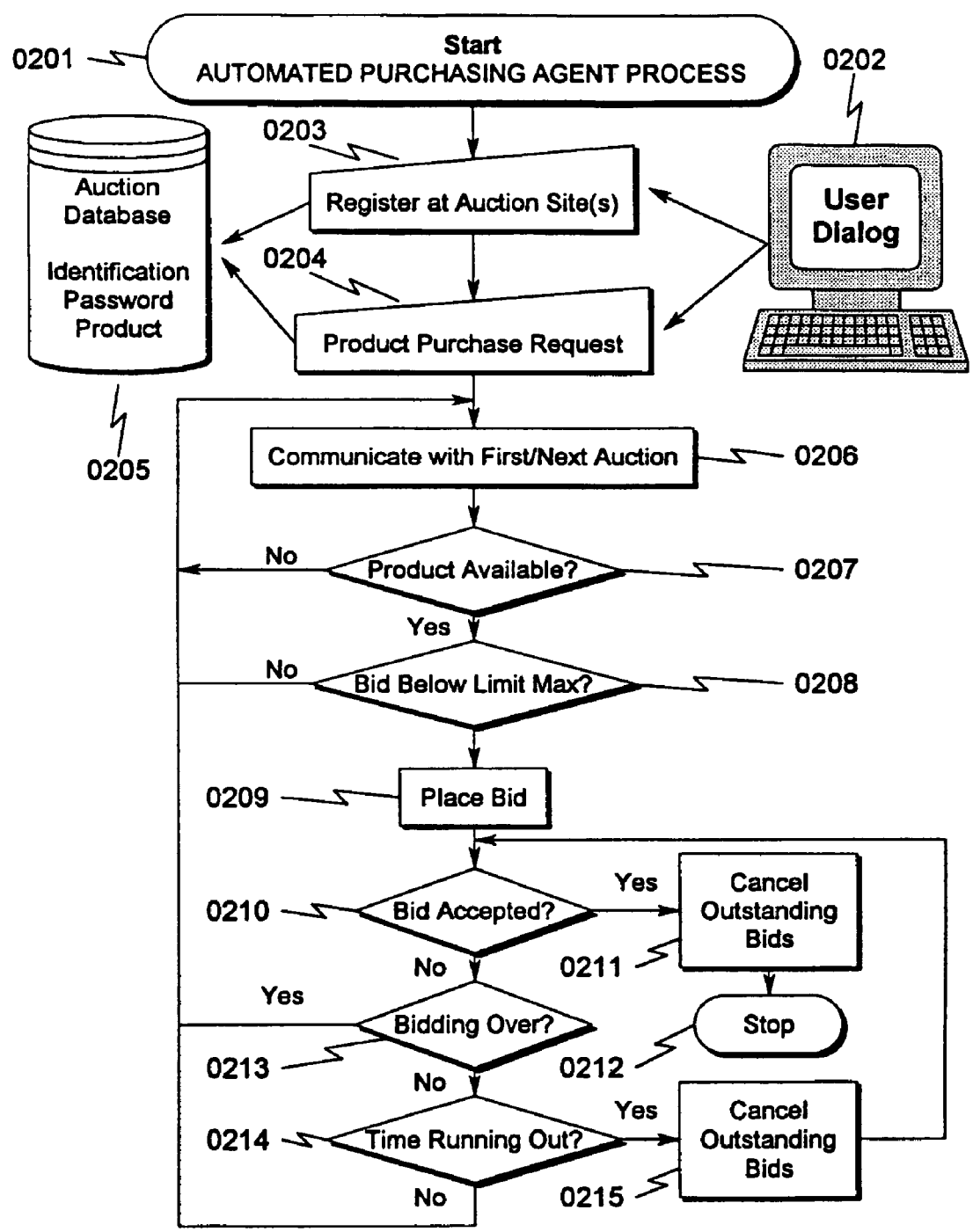
FIG. 2 illustrates a procedural block diagram of an exemplary embodiment of the present invention.

The system as described in FIG. 1 may be implemented using a process/method as exemplified by the process flowchart of FIG. 2.

Referring to FIG. 2, the automated purchasing agent process (0102) begins with registration at one or more auction sites (0203) typically via some user dialog console interface (0202). In many exemplary embodiments this interface is via a personal computer (PC), but need not be restricted to this context. The auction registration information is logged into an auction database (0205). Once this information is collected, the purchaser may enter using the same or different means a product purchase request (0204) that is also logged for later reference by the system.

At this point the process begins a loop in which communications with an initial or iterated auction web site is initiated (0206). Once this communication has been established, auction requests are initiated to determine if the desired product is available (0207), and if it is not, then another auction site is selected. If the product is available, then a check is performed to determine if the current bid is below the maximum limit set by the purchaser (0208), and if not, then the current auction site is skipped.

If the current bid is blow the maximum set by the purchaser (0208), then a bid is placed (0209). If this bid is accepted (0210), then outstanding bids at other auction sites are cancelled (0211) and the automated purchase process terminates.

If the bid placed by the purchaser is not accepted, then a check is performed to determine if bidding is over (bidding is closed, time has expired, etc.) (0213), and if so, the process returns to communicate with the next auction site (0206).

If bidding is not over but time is running out to place bids (0214), the process cancels outstanding bids (0215) that are higher than the minimum purchase bid and returns to determine if the current bid is accepted (0210). Otherwise, the process returns directly to communicate with other auction sites (0206) to place other bids on the same desired product.

Computer Software

As would be known by one skilled in the art and as indicated in FIGS. 1-2, the system and method illustrated in FIGS. 1-2 may be reduced to computer instruction codes and embodied on a computer readable storage means. This may take the form of a wide variety of storage media well known in the art and/or contemplated for future use. Thus, the present invention specifically anticipates the incorporation of the system and methods discussed herein in the form of tangible computer software products.

Furthermore, while not limitive of the scope of the present invention, the present invention specifically anticipates that one or more components of the present invention may be implemented using the Microsoft™ Windows™ operating environment in all its variations or its equivalent commercial embodiments.

System Generalization

Figure 3:
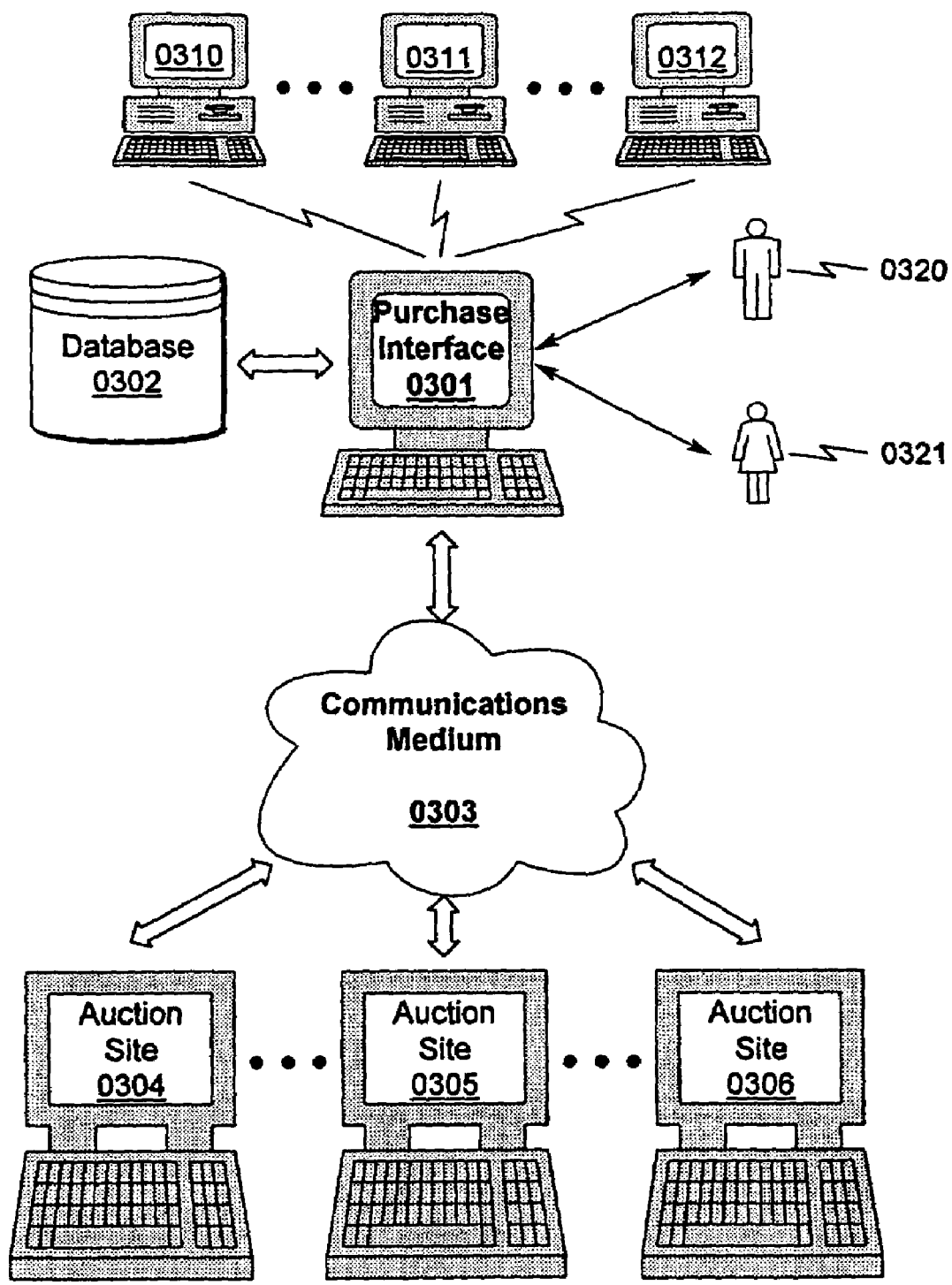
FIG. 3 illustrates a generalized block diagram illustrating some of the teachings of the present invention.

One skilled in the art will recognize that the teachings of the present invention as exemplified by the preferred embodiments illustrated in FIGS. 1-2 may be generalized further as illustrated in FIG. 3. Within this context, the purchase interface means (0301) and associated database means (0302) can comprise any combination of the elements illustrated in FIGS. 1-2, as well as other system components that will be clearly dictated by the context of FIG. 3.

The gist of the present invention as illustrated in FIG. 3 is a purchasing interface means (0301) that generates and uses a database means (0302) to direct purchase orders through a communications medium means (0303) to a variety of auction sites (0304, 0305, 0306) that may in general be any remote system for placing purchase orders, and not necessarily a sales system based on an auction-style paradigm.

As is illustrated in FIG. 3, this purchasing system (0301) may have an interface for human purchaser inputs (0320, 0321) and/or the capability for communication with remote computer sites incorporating any mixture of automated and/or human purchasing requests (0310, 0311, 0312). The ability to direct automated purchase requests through the purchase interface (0301) is of significant importance in automated manufacturing resource and/or inventory product planning supply systems (MRP), in which desired manufacturing flow dictates the purchase of and direction of raw materials throughout one or more assembly lines so as to minimize inventory costs and maximize assembly line efficiency. By permitting the purchasing system (0301) to respond to these requests, it can in many circumstances bid for a variety of products on an as-needed or as-anticipated basis and thus reduce the overall cost of doing business as compared with manual purchasing methods.

As an example, an intelligent automated purchasing system given remote access (0310, 0311, 0312 for example) to the purchasing system (0301) might be able to track the consumption of copier paper used within a large organization. With this knowledge, the purchasing system (0301) could be directed to continuously bid for copier paper based on the supply in hand as well as projected short and long term needs. These bids could then be used to keep a small local inventory of this material available so as to minimize the overall cost of copier paper. This same technique can be applied to inventory (for example, office supplies, etc.) as to assembly line manufacturing piece parts. The overall result is that by automating the purchasing process and integrating it within a possible auction-sale framework, the cost of purchase can be significantly reduced as compared to most forms of manual product purchasing.

Preferred System Context of the Present Invention

As mentioned previously, the present invention is amenable to a wide variety of applications. While the following applications are not limitative of the teachings of the present invention, they will provide one skilled in the art sufficient information to both apply the teachings of the present invention and aid in understanding the wide scope of application possible using the novel techniques disclosed by the present invention.

While the examples provided with the present disclosure have concentrated on application of the present invention to the area of Internet auction web sites, the scope of the present invention is much wider than this single application. For example, the present invention may be advantageously applied to automated purchases of stock over the Internet, as well as automated purchasing of piece parts in the context of manufacturing plants who want just-in-time purchases of materials at the lowest possible costs, yet are faced with dozens of potential suppliers who have prices that change on a daily basis. Obviously, it is impossible to manually track all of these price changes and achieve the same levels of efficiency as possible with the teachings of the present invention.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method on an information processing system for automatically purchasing products without user interaction, the method comprising:

receiving, via a user dialog, information necessary to register at a plurality of auction sites in order to obtain access to at least two of the plurality of auction sites wherein each of the at least two auction sites has a separate command language, a separate auction database, and a separate user interface thereto;

receiving, via the user dialog, at least one product purchase request for at least one of a product and a service;

communicating with at least two of the plurality of auction sites using the information necessary to access each auction database through both the separate user interface and the separate command language corresponding to each auction site;

determining if the product is available through both of the at least two of the plurality of auction sites, and in response to the product being available and until at least one of a (i) bid is accepted and (ii) time has expired for either of the at least two of the plurality of auction sites, performing the following:

determining if a current bid from both of the auction sites is below a maximum limit permitted, and in response to the current bid being below, performing the following without further user interaction;

placing at least two new bids including a first bid in a first command language for the product at a first of the at least two of the plurality of auction sites and a second bid in a second command language for the product at a second of the at least two of the plurality of auction sites in order for at least two bids to be active on the at least two of the plurality of auction sites at a same time;

determining if at least one of the new bids has been accepted and in response to at least one of the new bids being accepted, canceling outstanding bids at other auction sites of the plurality of auction sites where the at least one of the product and service is available; and determining if time has expired on any of the at least two new bids for a given auction site of the plurality of action sites and in response to the time expiring, canceling any outstanding bid for the given auction site.

2. The method of claim 1, wherein the information necessary to register at a plurality of auction sites is stored in an auction profile database.

3. The method of claim 2, wherein the information necessary to register at a plurality of auction sites includes protocol necessary to access each of the plurality of auction databases for performing a search in response to a purchase request.

4. The method of claim 2, wherein the information necessary to register at a plurality of auction sites includes protocol necessary to access each of the plurality of auction databases for placing a bid in response to a purchase request.

5. The method of claim 2, wherein the information necessary to register at a plurality of auction sites includes protocol necessary to access each of the plurality of auction databases for canceling a bid.

6. The method of claim 3, wherein the protocol necessary to access each of the plurality of auction databases is based on Extended Markup Language (XML).

7. The method of claim 4, wherein the protocol necessary to access each of the plurality of auction databases is based on Extended Markup Language (XML).

8. The method of claim 5, wherein the protocol necessary to access each of the plurality of auction databases is based on Extended Markup Language (XML).

9. The method of claim 1, wherein at least one of the plurality of auction sites is an Internet-based web auction site.

10. An information processing system for automatically purchasing products without user interaction, comprising:

a profile configuration tool for receiving, via a user dialog, information necessary to register at a plurality of auction sites in order to obtain access to at least two of the plurality of auction sites wherein each of the at least two auction sites has a separate command language, a separate auction database, and a separate user interface thereto;

an item selector for receiving, via the user dialog, at least one product purchase request for at least one of a product and a service;

an auction command interface for communicating with at least two of the plurality of auction sites using the information necessary to access each auction database through the both the separate user interface and the separate command language corresponding to each auction site;

an auction result definition and verification unit for determining if the product is available through both of the at least two of the plurality of auction sites, and in response to the product being available and until at least one of a (i) bid is accepted and (ii) time has expired for either of the at least two of the plurality of auction sites, performing the following:

an auction bid controller for determining if a current bid from both of the auction sites is below a maximum limit permitted, and in response to the current bid being below, performing the following without further user interaction;

placing at least two new bids including a first bid in a first command language for the product at a first of the at least two of the plurality of auction sites and a second bid in a second command language for the product at a second of the at least two of the plurality of auction sites in order for at least two bids to be active on the at least two of the plurality of auction sites at a same time;

determining if at least one of the new bids has been accepted and in response to at least one of the new bids being accepted, canceling outstanding bids at other auction sites of the plurality of auction sites where the at least one of the product and service is available; and determining if time has expired on any of the at least two new bids for a given auction site of the plurality of action sites and in response to the time expiring, canceling any outstanding bid for the given auction site.

11. The system of claim 10, further comprising:

an auction profile database for storing the information necessary to register at a plurality of auction sites.

12. The system of claim 11, wherein the information necessary to register at a plurality of auction sites includes protocol necessary to access each of the plurality of auction databases for performing a search in response to a purchase request.

13. The system of claim 11, wherein the information necessary to register at a plurality of auction sites includes protocol necessary to access each of the plurality of auction databases for placing a bid in response to a purchase request.

14. The system of claim 11, wherein the information necessary to register at a plurality of auction sites includes protocol necessary to access each of the plurality of auction databases for canceling a bid.

15. The system of claim 12, wherein the protocol necessary to access each of the plurality of auction databases is based on Extended Markup Language (XML).

16. The system of claim 13, wherein the protocol necessary to access each of the plurality of auction databases is based on Extended Markup Language (XML).

17. The system of claim 14, wherein the protocol necessary to access each of the plurality of auction databases is based on Extended Markup Language (XML).

18. The system of claim 10, wherein at least one of the plurality of auction sites is an Internet-based web auction site.

19. A computer-readable medium comprising programming instructions on an information processing system for automatically purchasing products without user interaction, the programming instructions including:
  receiving, via a user dialog, information necessary to register at a plurality of auction sites in order to obtain access to at least two of the plurality of auction sites wherein each of the at least two auction sites has a separate command language, a separate auction database, and a separate user interface thereto;
  receiving, via the user dialog, at least one product purchase request for at least one of a product and a service;
  communicating with at least two of the plurality of auction sites using the information necessary to access each auction database through the both the separate user interface and the separate command language corresponding to each auction site;
  determining if the product is available through both of the at least two of the plurality of auction sites, and in response to the product being available and until at least one of a (i) bid is accepted and (ii) time has expired for either of the at least two of the plurality of auction sites, performing the following:
  determining if a current bid from both of the auction sites is below a maximum limit permitted, and in response to the current bid being below, performing the following without further user interaction;
  placing at least two new bids including a first bid in a first command language for the product at a first of the at least two of the plurality of auction sites and a second bid in a second command language for the product at a second of the at least two of the plurality of auction sites in order for at least two bids to be active on the at least two of the plurality of auction sites at a same time;
  determining if at least one of the new bids has been accepted and in response to at least one of the new bids being accepted, canceling outstanding bids at other auction sites of the plurality of auction sites where the at least one of the product and service is available; and
  determining if time has expired on any of the at least two new bids for a given auction site of the plurality of action sites and in response to the time expiring, canceling any outstanding bid for the given auction site.

* * * * *